A. BECKER.
Stereoscope.
No. 890. Reissued Jan. 31, 1860.
Fig. 1,
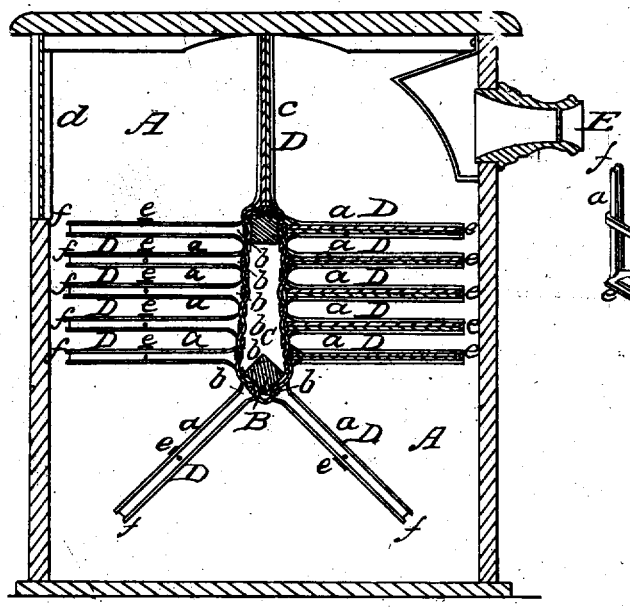
Fig. 3,
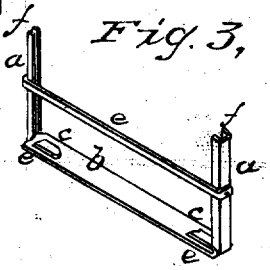
Fig. 2,
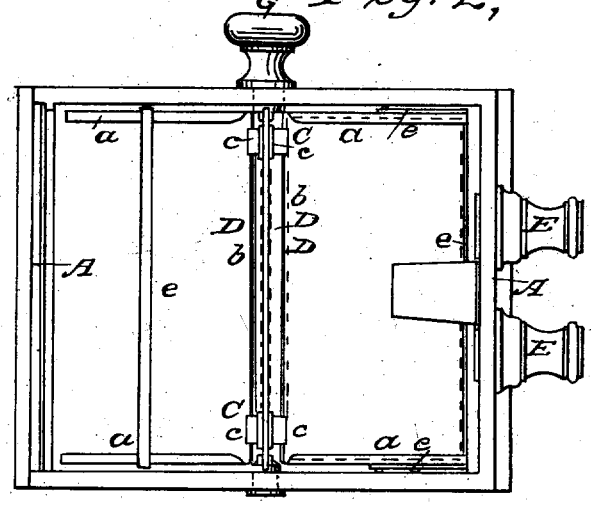
N. PETERS, Photo-Lithographer, Washington, D. C.

UNITED STATES PATENT OFFICE.

ALEXANDER BECKERS, OF NEW YORK, N. Y.

APPARATUS FOR EXHIBITING STEREOSCOPIC-PICTURES.

Specification forming part of Letters Patent No. 16,962, dated April 7, 1857; Reissue No. 890, dated January 31, 1860.

*To all whom it may concern:*

Be it known that I, ALEXANDER BECKERS, of the city, county, and State of New York, have invented a new and useful Apparatus for Exhibiting Stereoscopic and other Pictures, for which I have obtained Letters Patent of the United States, bearing date April 7, 1857, which are inoperative or invalid by reason of a defective specification, and that the error therein has arisen by inadvertency, accident, or mistake, and without any fraudulent or deceptive intention; and I do hereby declare that the following is a full, clear, and exact description of my invention, reference being had to the annexed drawings, making a part of this specification, in which—

Figure 1 is a vertical section of the apparatus at right angles to the plane of the pictures. Fig. 2 is a top view of the same with the cover removed to show the interior. Fig. 3 is a perspective view of one of the slides which receive the pictures.

Similar letters of reference indicate corresponding parts in these several figures.

The nature of my invention consists in constructing a stereoscopic apparatus, made to contain a number of stereoscopic or other pictures, attached to an endless band, belt, cord, chain, or apron in such a manner as to project therefrom and to form an angle therewith, the said belt being moved by a roller, axle, or pulley connected with an external handle, the rotation of which causes the successive presentation of the pictures to the eyes when the eyes are placed in a proper position near the eyeglasses or eye-holes of the apparatus.

To enable others skilled in the art to make and use my invention, I will proceed to describe it construction and operation.

A is a quadrangular box, in the sides of which are the bearings for the journals of two horizontal rollers, B B, which are placed one above the other and parallel with each other, and extend the whole width of the box, as shown in the drawings. These rollers may be of a square, triangular, polygonal, or other form.

C C are two endless belts, of webbing, rubber, or other strong material, stretched around the rollers, and intended to have a piece of dark cloth or other material stretched across them to form an endless apron of the width of the box, but this cloth is omitted in the drawings to leave exposed the two belts and show the manner of attaching the slides which receive the pictures.

D D are the slides, which I generally construct of a slip of tin-plate or other sheet metal, of a length equal to the length of the pictures added to twice the height thereof and of a width equal to the width of the sides of the rollers, by bending a piece, *a a*, at each end of a length equal to the height of the pictures, at right angles to the central portion, and turning inward the edges of the pieces *a a* to form two grooves of a sufficient width for the pictures to slide into, and I attach the central straight part, *b*, to the belts C C by cutting two slits, *c c*, at a suitable distance from each of the bends, as shown in Fig. 3, for the belts to pass through, and after passing the belts through the said slits clamping the metal upon the belts. The slides of this or of any other suitable construction are secured to the belts and hold the pictures in such a manner that each picture, when brought to its highest or lowest position by the movement given to the belts or apron will stand vertical or parallel with the lenses E of the eyeglasses, as is illustrated in Fig. 1, where a slide is shown in a vertical position above the upper roller opposite to the two eyeglasses or eye-holes E E. The pictures are shown in section, Fig. 1, and in outline in Fig. 2, in red color, fitting to the grooved parts *a a* of the slides.

*e e* are straps, of india-rubber or other elastic material, attached at their ends to the exterior side pieces, *a a*, of the slides some distance from the ends thereof, for the purpose of confining the pictures in the slides and preventing them from falling out when the slides are inverted below the bottom roller. These straps, when the pictures are in the slides, are drawn over the tops of the slides, as shown at the right hand of the apron in Figs. 1 and 2, and rest on the top or outer edge of the picture. Notches *f f* are provided in the ends of the grooved parts *a a* of the slides, to prevent the straps slipping off the pictures.

When it is desired to remove the pictures from the slides, the straps *e e* are pulled out of the notches *f f*, and their elasticity draws them over against the sides of the parts *a a* of the slides, as shown at the left hand of Figs. 1 and 2.

The particular example of my apparatus thus represented is intended for the exhibition of photographic pictures on glass, and consequently the light is admitted to the box by a glass in the back of the box, but in an apparatus for the exhibition of pictures on any opaque material the light would be admitted at the top of the box.

The belts C C are moved to present the pictures successively in a vertical position opposite the glasses E E by turning the handle G, which is attached to one end of one of the rollers outside the box. The picture which is in this position is held steady by resting on the broad part or foot *b* of the slide, which rests on the flat surface of the roller.

The example of my invention shown in the drawings is constructed for a small number of pictures only, but it is evident that the number of slides may be greatly increased without adding much to the size of the box. In this economy of space consists the superiority of this apparatus over those instruments constructed for similar purposes, in which the pictures were attached to each other by their edges to form the endless belt, and which required a box elevation for each picture in proportion to the width or height of each picture.

If desired, the pictures may be exhibited below the lower instead of above the upper roller. This arrangement would perhaps be most convenient in a very high box to contain a large number of pictures.

In the apparatus represented in the drawings the pictures are packed horizontally, one over the other, instead of being attached to each other by their edges, as in the former construction, for the reason also that this arrangement is equally applicable to glass pictures and to opaque pictures, whereas in the former construction opaque pictures only could be successfully exhibited.

In the apparatus as represented in the drawings each picture or picture-holder assumes during the greater part of its way a position vertical to the line of motion When the said picture passes over the roller, it assumes various angles with the line of motion, and at the moment of its exhibition it is parallel with the central line of the endless belt, and in this respect my method of exhibiting the pictures differs from that formerly in use, when the pictures formed part of the endless belt and were always parallel with the line of motion.

I do not claim, however, a stereoscopic apparatus in which the pictures or picture-holders are attached to each other by their edges to form part of the endless belt or a parallel line with the same, as this mode of construction has been known before.

Another advantage of the apparatus as represented in the drawings over that formerly constructed consists in the fact that either direct or reflected light, as required by the different kinds of pictures, may be admitted into the apparatus. When desired, light may be thrown down through the roof or top of the apparatus, instead of admitting it through the sides, as represented on the drawing.

Having thus described my invention and the manner of using the same, what I claim as new, and desire to secure by Letters Patent, is—

1. A stereoscopic apparatus made to contain a number of stereoscopic pictures, said pictures being attached to an endless belt, band, cord, chain, or apron in such a manner as to project therefrom and to form an angle therewith, the said endless belt being moved by a roller, axle, or pulley connected with an external handle, the rotation of which causes the successive presentation of the said pictures to the eyes, substantially as described.

2. The construction of the slides D D, substantially as set forth, when combined with a stereoscopic apparatus.

ALEX. BECKERS.

Witnesses:
CHARLES WEHLE,
JULIUS WEHLE.